(12) United States Patent
Rashid et al.

(10) Patent No.: US 9,858,299 B2
(45) Date of Patent: Jan. 2, 2018

(54) SYSTEM AND METHOD FOR GENERATING A JSON SCHEMA FROM A JSON STREAM

(71) Applicant: ORACLE INTERNATIONAL CORPORATION, Redwood Shores, CA (US)

(72) Inventors: Mohammad Aminur Rashid, Bangalore (IN); Nitesh Waghela, Bangalore (IN)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 351 days.

(21) Appl. No.: 14/749,396

(22) Filed: Jun. 24, 2015

(65) Prior Publication Data

US 2016/0378792 A1    Dec. 29, 2016

(51) Int. Cl.
G06F 17/30    (2006.01)
G06F 9/54     (2006.01)

(52) U.S. Cl.
CPC ........ G06F 17/30292 (2013.01); G06F 9/54 (2013.01); G06F 17/30516 (2013.01)

(58) Field of Classification Search
CPC . G06F 17/30292; G06F 9/54; G06F 17/30516
USPC ....................................................... 707/804
See application file for complete search history.

(56) References Cited

U.S. PATENT DOCUMENTS

| | | | |
|---|---|---|---|
| 6,418,446 B1 * | 7/2002 | Lection | G06F 17/30896 |
| 6,631,519 B1 * | 10/2003 | Nicholson | G06F 17/30292 707/999.102 |
| 6,763,499 B1 * | 7/2004 | Friedman | G06F 17/2247 715/240 |
| 7,836,393 B2 * | 11/2010 | Soderberg | G06F 17/2247 715/234 |
| 8,341,212 B2 | 12/2012 | Diament | |
| 8,515,999 B2 * | 8/2013 | de Cerqueira Gatti | G06F 17/3092 707/791 |
| 8,732,213 B2 | 5/2014 | Sowell | |
| 9,075,833 B2 * | 7/2015 | Gao | G06F 17/30292 |

(Continued)

OTHER PUBLICATIONS

Izquierdo, Javier Luis Canovas, et al., "Discovering Implicit Schemas in JSON Data", ICWE 2013, LNCS 7977, Springer-Verlag, Berlin, Germany, © 2013, pp. 68-83.*
Bartolomeo, Giovanni, et al., "Design and Development Tools for Next Generation Mobile Services", ICSEA 2007, Cap Esterel, France, Aug. 25-31, 2007, IEEE Xplore, 6 pages.*
JSON Schema generator, JSON Schema.net, 4 pages, Aug. 7, 2015 Retrieved from: http://www.jsonschema.net/faq.html.
Davison, Quick, and a bit dirty, JSON Schema Generation with MOXy 2.5.1, Apr. 18, 2014, 6 pages. Retrieved from http://ww.jsonschema.net/index.html#.

(Continued)

*Primary Examiner* — Robert Stevens
(74) *Attorney, Agent, or Firm* — Tucker Ellis LLP

(57) ABSTRACT

In accordance with an embodiment, described herein is a JSON schema generator that parses a JSON stream, determines a data type of each record of the JSON stream, and selects a corresponding record schema generation logic component based on the determined data type to build a record schema for that record. In building a record schema, each element in a record and each sub-element in one or more nested layers of the record can be examined, to determine their data types. A corresponding parser can be selected for each element and sub-element based on a determined data type to generate a schema node. The generated schema nodes can be joined together to create a record schema for the record. Each record schema can be dynamically merged together to create a schema for the JSON stream.

20 Claims, 4 Drawing Sheets

(56) References Cited

U.S. PATENT DOCUMENTS

| | | | | |
|---|---|---|---|---|
| 2010/0114620 A1* | 5/2010 | Diament | G06F 8/36 | 709/203 |
| 2011/0107346 A1 | 5/2011 | Engbers | | |
| 2013/0086100 A1* | 4/2013 | de Cerqueira Gatti | G06F 17/3092 | 707/769 |
| 2013/0166568 A1* | 6/2013 | Binkert | G06F 17/30911 | 707/741 |
| 2014/0067866 A1 | 3/2014 | Chen | | |
| 2014/0181141 A1* | 6/2014 | Sowell | G06F 17/30911 | 707/769 |
| 2014/0207826 A1* | 7/2014 | Gao | G06F 17/30292 | 707/803 |
| 2015/0379049 A1* | 12/2015 | Gao | G06F 17/2247 | 707/804 |
| 2016/0110421 A1* | 4/2016 | Galle | G06F 17/30557 | 707/769 |
| 2016/0117410 A1* | 4/2016 | Kam Iya | G06F 17/30958 | 715/242 |
| 2017/0206256 A1* | 7/2017 | Tsirogiannis | G06F 17/30563 | |

OTHER PUBLICATIONS

Kristensen, et al., JSON Schema Generator, Jun. 3, 2014, 2 pages. Retrieved from: http://java.dzone.com/articles/quick-and-bit-dirty-json.

json_schema_generator 0.3, 3 pages, Aug. 7, 2015 Retrieved from: http://visualstudiogallery.msdn.microsoft.com/b4515ef8-a518-41ca-b48c-bb1fd4e6faf7.

Droettboom, et al., Understanding JSON Schema, Release 1.0, Jul. 28, 2014, 54 pages Retrieved from http://spacetelescope.github.io/understanding-json-schema/UnderstandingJSONSchema.pdf.

Hilaiel, Orderly JSON, 2 pages. Retrieved from: http://orderly-json.org/, Aug. 7, 2015.

Kashyap, An Introduction to JSON Schema, Apr. 5, 2014, 11 pages. Retrieved from: http://crypt.codemancers.com/posts/2014-02-11-An-introduction-to-json-schema/.

Vahlas, JSON Schema: specifying and validating JSON data Structures, Apr. 23, 2010, 14 pages. Retrieved from: http://nico.vahlas.eu/2010/04/23/json-schema-specifying-and-validating-json-data-structures/.

* cited by examiner

SYSTEM AND METHOD FOR GENERATING A JSON SCHEMA FROM A JSON STREAM

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to software applications, and are particularly related to an application programming interface (API) for generating a JSON schema from a JSON stream.

BACKGROUND

JSON (JavaScript Object Notation) is an open and text-based data exchange format and derived from object literals of JavaScript. JSON supports primitive data types, for example string, number, Boolean and null; and structural data types, for example object and array. JSON has become a popular data exchange format in recent years due to its leaner structure compared with XML, and its ability to directly interact with JavaScript.

In an enterprise application environment, a server system, such as a stock trading system, often needs to share data in JSON format with different interfacing systems. An interfacing system or client system typically uses published data from the server system to generate a JSON schema, and uses the generated schema to pre-validate incoming data to avoid unnecessary processing loads on the client system.

SUMMARY

In accordance with an embodiment, described herein is a JSON schema generator that parses a JSON stream, determines a data type of each record of the JSON stream, and selects a corresponding record schema generation logic component based on the determined data type to build a record schema for that record. In building a record schema, each element in a record and each sub-element in one or more nested layers of the record can be examined, to determine their data types. A corresponding parser can be selected for each element and sub-element based on a determined data type to generate a schema node. The generated schema nodes can be joined together to create a record schema for the record. Each record schema can be dynamically merged together to create a schema for the JSON stream.

DETAILED DESCRIPTION

A JSON schema is a JSON based format for defining the structure of JSON data, and can be used to validate JSON data or stream from a particular source, so that the JSON data can conform to a format required by an application on a server to avoid unnecessary processing loads on the server.

A JSON schema can be created manually or using a tool, for example JaxB, from a sample JSON data. Typically, a user or tool that creates the JSON schema needs to be aware of the structure or format of the sample JSON data, creates one or more data objects representing the data, and then convert the data objects into a JSON schema.

Accordingly, a software application that can automatically generate a JSON schema from a JSON stream without being aware of the structure of the JSON stream can be useful in a variety of environments. For example, such an application can be implemented in data control objects in an application development framework (ADF).

In accordance with an embodiment, described herein is a JSON schema generator that parses a JSON stream, determines a data type of each record of the JSON stream, and selects a corresponding record schema generation logic component based on the determined data type to build a record schema for that record. In building a record schema, each element in a record and each sub-element in one or more nested layers of the record can be examined, to determine their data types. A corresponding parser can be selected for each element and sub-element based on a determined data type to generate a schema node. The generated schema nodes can be joined together to create a record schema for the record. Each record schema can be dynamically merged together to create a schema for the JSON stream.

In accordance with an embodiment, using the system, each record of a particular data type in the JSON stream can be nested with one or more layers of a same or different data types. The system can parse the JSON stream and dynamically generate a schema that accounts for a variety of nested structures in each record without being aware of these structures before processing the JSON stream. As such, the system provides a reliable and efficient way of generating a JSON schema from a JSON stream of complicated structures.

Figure 1:
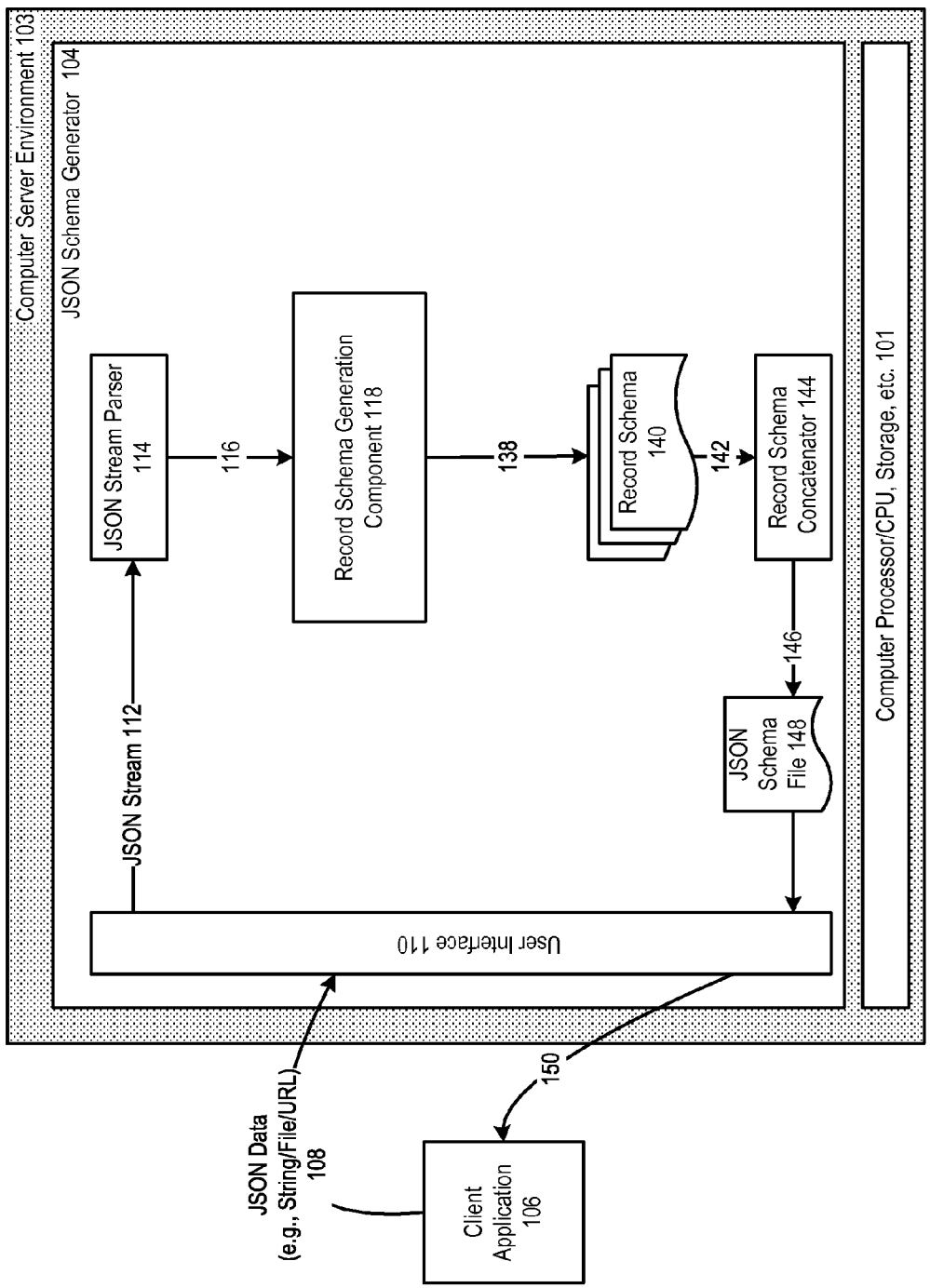
FIG. 1 illustrates a system for generating a JSON schema from a JSON stream, in accordance with an embodiment.

FIG. 1 illustrates a system for generating a JSON schema from a JSON stream, in accordance with an embodiment.

As shown in FIG. 1, a JSON schema generator 104 can be deployed in a computer server environment 103 executing on one more microprocessors, as a standalone software application or as part of another software application. A user interface 110 can receive JSON data from a plurality of sources 108, (for example a URL, a file, or a string) provided by a client application 106; and can convert the JSON data into a JSON stream 112, which can represent a continuous stream of recognizable JSON entities, for example JSON object or arrays. The JSON stream can include a plurality of entities of a same data type (for example, object or array). Each entity can be considered a JSON data record of the data type.

In accordance with an embodiment, a JSON stream parser 114 can identify the data type of each JSON record, and invoke 116 a record schema generation component 118 to generate 138 a record schema 140 for that record.

As further shown in FIG. 1, the record schemas can be provided 142 to a record schema concatenator 144, which can merge a first and second record schema to create a new record schema, and use the new schema record as a base schema to dynamically merge a newly generated record schema to the base schema.

The above steps of identifying a data type of each JSON stream record, creating a record schema for that record, and merging the record schema to the base schema can be repeated until the entire JSON stream is processed. Once completed, the base schema that has incorporated different features of each of the record schemas can be provided 146 as a JSON schema file 148 for the JSON stream, and sent 150 to the client application.

Figure 2:
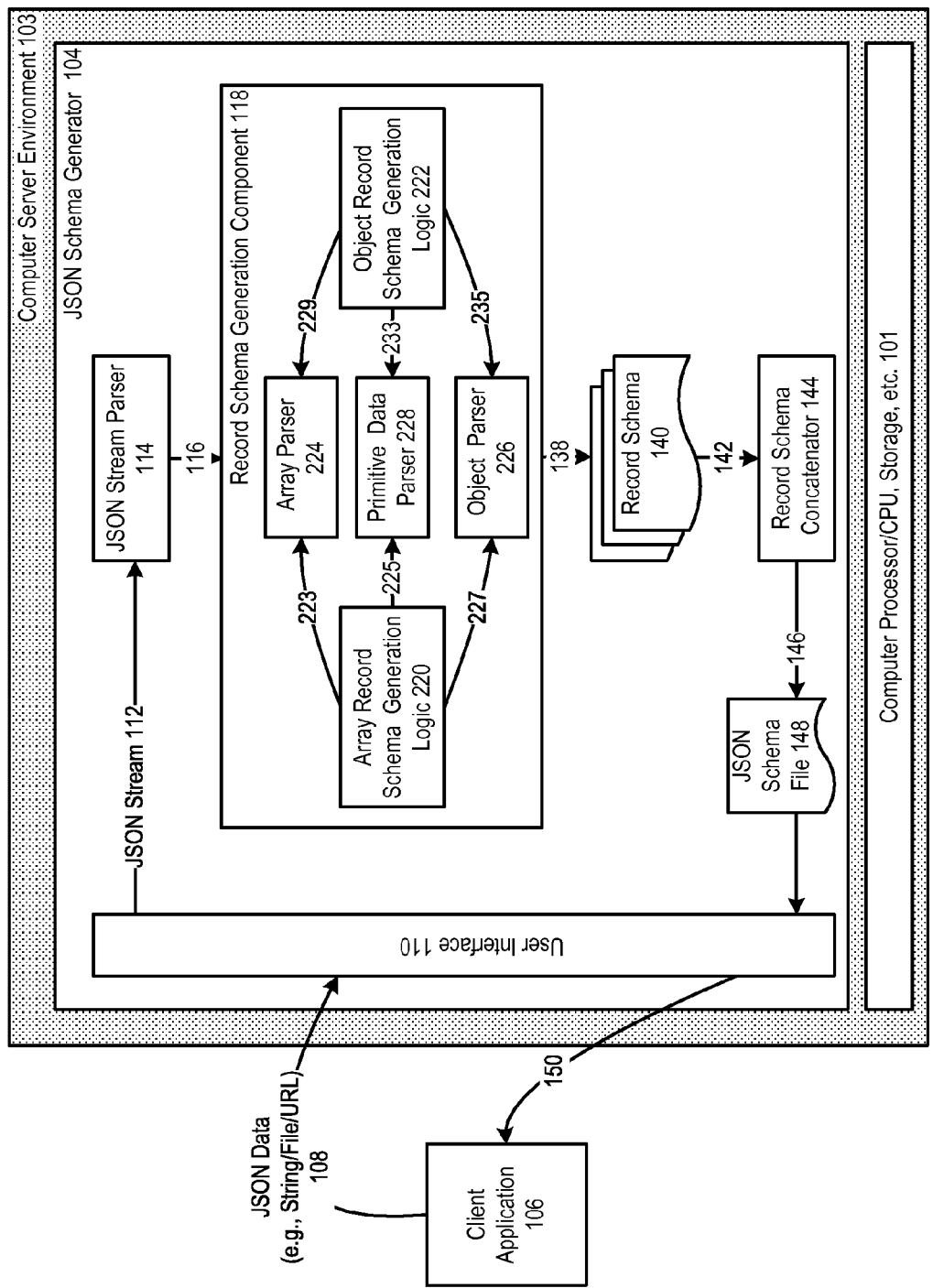
FIG. 2 further illustrates a system for generating a JSON schema from a JSON stream, in accordance with an embodiment.

FIG. 2 further illustrates a system for generating a JSON schema from a JSON stream, in accordance with an embodiment.

As shown in FIG. 2, the record schema generation component can include an array record schema generation logic component 220 and an object record schema generation logic component 222. Each record schema generation logic component can be invoked by the JSON stream parser based on the data type of a JSON stream record received at the record schema generation component.

In accordance with an embodiment, each record schema generation logic component can determine elements of a JSON stream record, determine a data type of each element, and invoke a corresponding data type parser (for example, an array parser 224, an object parser 226 or a primitive data parser 228), to generate a node schema for that element. For example, the array parser can generate a schema node for an element of an array data type. The object parser can generate a schema node for an element of an object data type. The primitive data parser can generate a node schema for each of the primitive types supported in JSON.

Each of the elements in either an array or object can be nested with one or more layers of array or object data types. Each record schema generation logic component can similarly determine the structure of each nested layer, including determining the data type of each sub-element in that layer, generate a node schema for that sub-element.

As such, the array record schema generation logic component can invoke 223, 225, 227 the array parser, the primitive data parser and the object parser to process elements or sub-elements in each nested layer of the record. Similarly, the object record schema generation logic component can invoke 229, 233, 235 the same set of parsers to process elements or sub-elements in each nested layer.

In accordance with an embodiment, once a schema node has been generated for each element or sub-element in a record, the schema nodes can be joined together to create a record schema for the record.

In accordance with an embodiment, the array record schema generation logic component and the object record schema generation logic component can use different approaches to join schema nodes to accommodate the different structures in an array or object data types.

Figure 3:
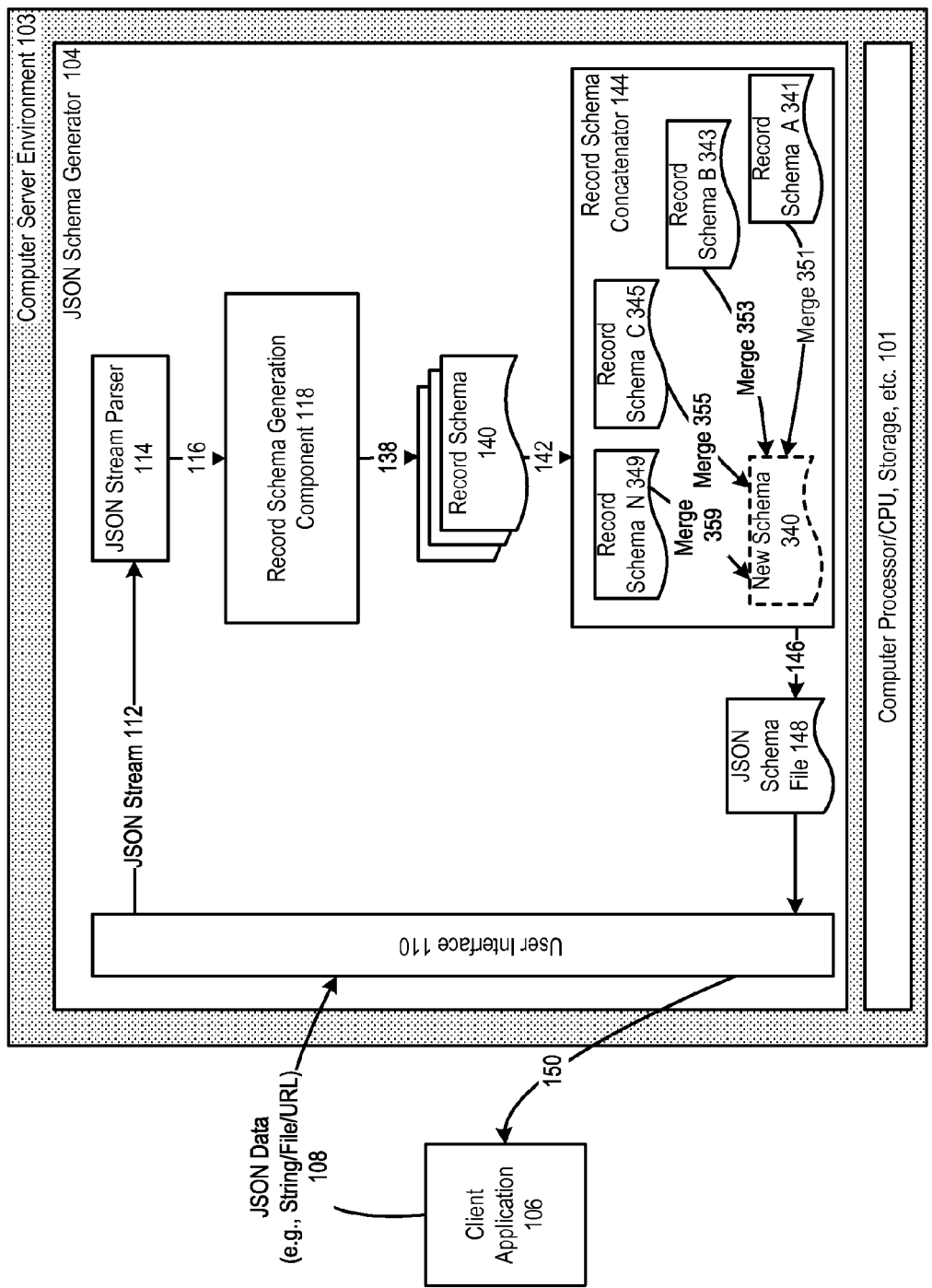
FIG. 3 further illustrates a system for generating a JSON schema from a JSON stream, in accordance with an embodiment.

FIG. 3 further illustrates a system for generating a JSON schema from a JSON stream, in accordance with an embodiment.

As shown in FIG. 3, the record schema concatenator 144 can load a first record schema (for example, record schema A 341) into memory as the first record is generated. When a second record schema (for example, record schema B 343) is generated, the first and second record schemas can be merged 351, 353 to create a new schema 340.

As an illustrative example, two records of a JSON stream can be {"name": "Aminur"; "city": "Bangalore"}, and {"name": "Nitesh"; "email": "abc@xyz.com"}. Each record includes two data sets, and is an entity of an object data type that represents an employee. The JSON stream parser can identity each record as an object data type, and invoke an object record schema generation logic component to generate a record schema for each record, for example {"name", "city"} and {"name", "email"}. The two record schemas can be merged to generate a new schema, for example {"name", "city", "email"}.

In accordance with an embodiment, the new schema can be used as a base schema, and each newly generated record schema (for example, record schema C 345 and record schema N 349) can be subsequently merged 355, 359 into the base schema. As each newly generated record is being merged into the base schema, the base schema can be dynamically modified to accommodate any structural differences in each record schema.

The steps of identifying data types, and creating and merging of record schemas, can be repeated until the entire JSON stream is processed.

Figure 4:
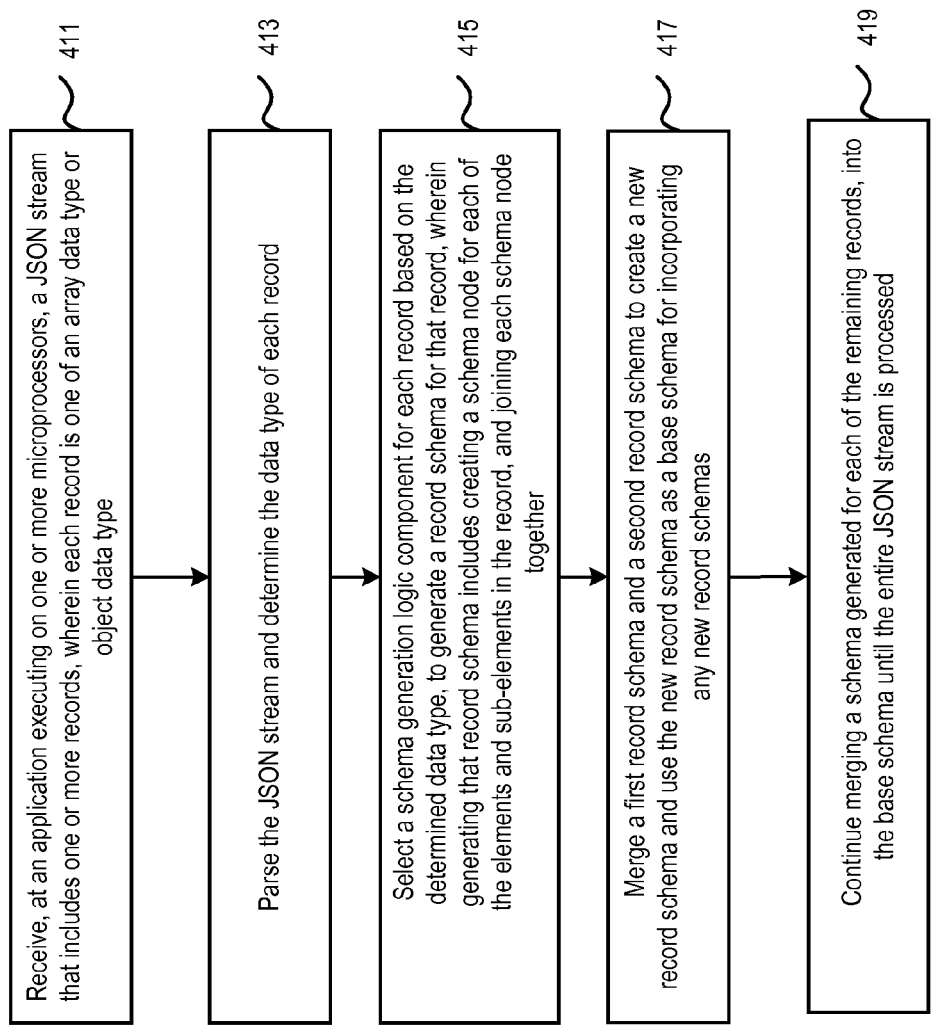
FIG. 4 illustrates a method for generating a JSON schema from a JSON stream, in accordance with an embodiment.

FIG. 4 illustrates a method for generating a JSON schema from a JSON stream, in accordance with an embodiment.

As shown in FIG. 4, at step 411, a JSON stream that includes one or more records of a same data type is received from a client application. Each of the one or more records can be one of an array data type or an object data type.

At step 413, a JSON stream parser can be used to parse the JSON stream, to determine a data type of each record.

At step 415, a record schema generation logic component can be selected for each record based on the determined data type, to generate a record schema for that record, wherein generating that record schema includes creating a schema node for each of the elements and sub-elements in the record, and joining each schema node together.

At step 417, a record schema concatenator can be invoked to merge a first record schema and a second record schema to create a new record schema, wherein the new record schema can be used as a base schema for incorporating any new record schemas.

At step 419, a schema generated for each of the remaining records is merged into the base schema until the entire JSON stream is processed, and the base schema is provided to the client application as the schema for the JSON stream.

Exemplary Implementation

In accordance with an embodiment, a system for generating a JSON schema from a JSON stream can be implemented using a plurality of application programming interface (API) objects. The API objects and sample code provided below are for illustration purposes and should not be construed to limit any of the embodiments of the invention.

A user interface can be implemented using the following API objects to enable users to provide JSON streams to the system.

```
APIs to set JSON streams
    public void setJsonSource(File file)
    public void setJsonSource(InputStream inputStream)
    public void setJsonSource(String string)
APIs to generate schemas (with optional choice of formatting)
    public String generate( )
    public String generate(PrettyPrinter printer)
    public void generate(OutputStream out)
    public void generate(OutputStream out, PrettyPrinter printer
```

A JSON stream parser can be implemented using the following API objects to parse the JSON streams and identify the data types of each of the records in the JSON streams. These API objects can include JSON data that is deeply nested. For example, a department object can include an employee object, which further includes an address object. Once the structure of a JSON element in a JSON record is identified, a schema node can be generated using the following API objects.

```
Interface to parse the input stream (JSON data) provided by users
    JsonDataReader
In-built classes to parse standard JSON data types
    JsonArrayDataParser
    JsonObjectDataParser
    JsonPrimitiveDataParser
Factory class to select a parser based on JSON data types
    JsonParserFactory
```

In accordance with an embodiment, the generated schema nodes can be represented using the following API objects.

```
Schema structure is represented by
    JsonData
Supported schema node type is defined in
    JsonPrimitiveType
Class to represent schema node type
    JsonPrimitiveData
    JsonObjectData
    JsonArrayData
```

The following sample code illustrates how to use the above-described API objects to construct an application to generate JSON schema from a JSON stream.

The first example illustrates a JSON string that includes a plurality of JSON records, where each record is a JSON object.

```
JsonSchemaGenerator generator = new JsonSchemaGenerator( );
/** Example 1 with input source as String
{
  "tags": [
    {
      "f3":1,
      "f2":2
    },
    {
      "f2":1,
      "f3":3
    },
    {
      "f1":1,
      "f3":2,
      "f4":4
    }
  ]
}
*/
String JsonString = "{\n\"tags\": [{\"f3\":1,\"f2\":2},{\"f2\":1,\"f3\":3},{\"f1\":1,\"f3\":2,\"f4\":4}]\n}";
generator.setJsonSource(jsonString);
String outSchema = generator.generate( );
System.out.println(outSchema);
/**Generated JSON schema*/
{
  "$schema": "http://www.oracle.com/schema",
  "id": "http://www.oracle.com/schema",
  "type": "object",
  "properties": {
    "tags":{
      "type": "array",
      "items": {
        "type": "object",
        "properties": {
          "f1":{
            "type": "number"
          },
          "f3":{
            "type": "number"
          },
          "f2":{
            "type": "number"
          },
          "f4":{
            "type": "number"
          }
        }
      }
    }
  },
  "required": ["f3"]
}
```

Embodiments of the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of embodiments of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated.

What is claimed is:

1. A system for automatically generating a JSON schema from a JSON stream, including
   a computer including one or more microprocessors;
   a software application executing on the computer, wherein the software application includes
      a plurality of data type parsers,
      a factory class,
      a plurality of record schema generation logic components, and
      a record schema concatenator;
   wherein when receiving a JSON stream, the software application operates to determine a data type of each record in the JSON stream, determine a data type of each element of a plurality of elements in the record, use the factory class to select, from the plurality of data type parsers, a particular data type parser to generate a schema node for each of the plurality of elements in the record, select, based on the determined data type of the record, a corresponding record schema generation logic component to combine each schema node to generate a record schema for that record, and use the record schema concatenator to join each record schema to create a schema for the JSON stream.

2. The system of claim 1, wherein the data type of each record in the JSON stream is one of an array data type or an object data type supported by JSON.

3. The system of claim 2, wherein each record in the JSON stream is nested with one or more layers, each layer including sub-elements of particular JSON data types.

4. The system of claim 1, wherein the plurality of record schema generation components include an array record schema generation logic component, and an object record schema generation logic component.

5. The system of claim 1, wherein combining each record schema to create the schema for the JSON stream include merging a first and a second record schemas to create a new schema as a base schema, and dynamically merging each newly generated record schema into the base schema.

6. The system of claim 5, further including dynamically modifying the base schema with each newly generated record schema to accommodate any structural differences in the newly generated record schema.

7. The system of claim 1, further comprising a user interface that accepts JSON data from a plurality of sources, including a file, a string and a URL.

8. The system of claim 1, wherein the software application needs not to be aware of the structure of the JSON stream before processing the JSON stream.

9. The system of claim 1, wherein the steps of identifying data types, and creating and merging of record schemas are repeated until the entire JSON stream is processed.

10. A method for automatically generating a JSON schema from a JSON stream, including receiving a JSON stream at a software application executing on the computer, wherein the software application includes a plurality of data type parsers, a factory class, a plurality of record schema generation logic components, and a record schema concatenator;

determining a data type of each record in the JSON stream;

determining a data type of each element of a plurality of elements in the record;

using the factory class to select, from the plurality of data type parsers, a particular data type parser to generate a schema node for each of the plurality of elements in the record, selecting, based on the determined data type, a corresponding record schema generation logic component to combine each schema node to generate a record schema for that record; and using the record schema concatenator to join each record schema to create a schema for the JSON stream.

11. The method of claim 10, wherein the data type of each record in the JSON stream is one of an array data type or an object data type supported by JSON.

12. The method of claim 11, wherein each record in the JSON stream is nested with one or more layers, each layer including sub-elements of particular JSON data types.

13. The method claim 10, wherein the plurality of record schema generation components include an array record schema generation logic component, and an object record schema generation logic component.

14. The method of claim 10, wherein combining each record schema to create the schema for the JSON stream include merging a first and a second record schemas to create a new schema as a base schema, and dynamically merging each newly generated record schema into the base schema.

15. The method of claim 14, further including dynamically modifying the base schema with each newly generated record schema to accommodate any structural differences in the newly generated record schema.

16. The method of claim 10, further comprising a user interface that accepts JSON data from a plurality of sources, including a file, a string and a URL.

17. The method of claim 10, wherein the software application needs not to be aware of the structure of the JSON stream before processing the JSON stream.

18. A non-transitory computer readable storage medium, including instructions stored thereon which when read and executed by one or more computers cause the one or more computers to perform the steps comprising:

receiving a JSON stream at a software application executing on the computer, wherein the software application includes a plurality of data type parsers, a factory class, a plurality of record schema generation logic components, and a record schema concatenator;

determining a data type of each record in the JSON stream;

determining a data type of each element of a plurality of elements in the record;

using the factory class to select, from the plurality of data type parsers, a particular data type parser to generate a schema node for each of the plurality of elements in the record, selecting, based on the determined data type, a corresponding record schema generation logic component to combine each schema node to generate a record schema for that record; and using the record schema concatenator to join each record schema to create a schema for the JSON stream.

19. The non-transitory computer readable storage medium of claim 18, wherein the data type of each record in the JSON stream is one of an array data type or an object data type supported by JSON.

20. The method of claim 19, wherein each record in the JSON stream is nested with one or more layers, each layer including sub-elements of particular JSON data types.

* * * * *